INVENTORS
MICHAEL J. BUCKINGHAM
WILLIAM M. FAIRBANK
BY [signature]
ATTORNEYS

INVENTORS
MICHAEL J. BUCKINGHAM
WILLIAM M. FAIRBANK
BY Kenyon and Kenyon
ATTORNEYS INVENTORS
MICHAEL J. BUCKINGHAM
WILLIAM M. FAIRBANK
BY Kenyon and Kenyon
ATTORNEYS INVENTORS
MICHAEL J. BUCKINGHAM
WILLIAM M. FAIRBANK
BY Kenyon and Kenyon
ATTORNEYS INVENTORS
MICHAEL J. BUCKINGHAM
WILLIAM M. FAIRBANK
BY Kenyon and Kenyon
ATTORNEYS 3,043,512
Patented July 10, 1962

3,043,512

SUPERCONDUCTIVE PERSISTATRONS AND COMPUTER SYSTEMS FORMED THEREBY

Michael J. Buckingham and William M. Fairbank, Durham, N.C.; said Buckingham assignor to Duke University, Inc., Durham, N.C., a corporation of North Carolina Filed June 16, 1958, Ser. No. 742,363
24 Claims. (Cl. 235—175)

The present invention relates generally to superconductive electronic devices, and more particularly to logical circuits for computers utilizing a novel superconductive memory and directional-switching element, hereinafter referred to as a persistatron.

In a digital computer, the performance of mathematical functions called for in solving problems is carried out in the operations system. Among the functions performed are addition, subtraction and other arithmetic operations, as well as error detection, numeric word comparison and numerous control functions.

Each of these operations can be performed by arrays of the more basic functions of AND, OR, inversion, relay and storage. In the computer art, the term "circuit logic" refers to the performance of one or more of the basic functions by means of electronic components and circuits, while the expression "system of circuit logic" signifies a set of components and circuit types together with a scheme for effecting interconnections among them whereby the basic functions can be assembled to perform any desired computer operation.

Existing systems of circuit logic may broadly be grouped into three main classes; namely, the vacuum tube system, the transistor system and the magnetic core system. Without drawing comparisons between these systems or discussing their relative merits, it can be said that a modern computer based on any one of the three known systems will necessarily be complex in design and involve, in addition to the basic components characterizing the system (i.e., tubes, transistors or cores), vast quantities of condensers, resistors and other standard circuit components. Moreover, the power consumption of a conventional system will be considerable and the space requirements quite substantial.

A new system of circuit logic has recently been proposed based on the so-called cryotron device devised by D. A. Buck (Proceedings of IRE, vol. 44, pp. 482–493, April 1956). The cryotron utilizes the superconductive properties of metals at low temperatures. Almost fifty years ago it was discovered that the electrical resistance of some substances drops to zero when the temperature of the substance is reduced below a certain transitional value characteristic of the substance. In all instances the transition point is extremely low, usually in the region of 2 to 8 degrees Kelvin.

The cryotron is constituted by a winding surrounding a straight wire and makes use of the magnetic field produced by current flow in the winding to convert the straight wire from the superconducting state to the normal state, thereby controlling its resistance. The operation is based on the fact that the transition temperature is a function of the magnetic field at the location of the wire, the transition temperature decreasing with increasing field.

The cryotron acts effectively as a relay having a normally closed contact, and in the absence of a signal applied to the winding, current flows freely in the straight wire. To perform logical functions, two or more cryotrons must be combined in various ways. For example, in order to obtain storage or memory effects, it is necessary to connect two cryotrons, each acting as an inverter, in a feedback path so that the current supply passes through the input winding of one and the straight wire of the other whereby a flip-flop or bistable action is produced. Thus, fundamentally, the cryotron is a simple switching or gating element and logical actions can be obtained only by relatively elaborate combinations of cryotrons.

In view of the foregoing, it is the primary object of the present invention to provide a superconductive device capable of sustaining a persistent current and adapted to act as a memory element or a directional switch. Because of the persistent current effect, the device has been designated a "persistatron." A persistatron acting as a memory cell has been designated a p-store and one acting as a directional switch as a p-switch.

More particularly, it is an object of the invention to provide an efficient and reliable system of circuit logic which makes use of persistatrons to carry out basic computer functions, such as storage, AND, OR and other operations.

A significant advantage of the present invention is that it greatly simplifies computer design, and logical circuits incorporating persistatrons may be made in very small size. Moreover, persistatron circuits have a low power consumption and operate reliably at high speed.

Because of the relatively low cost of persistatron units and their elemental structure as compared to conventional logical circuit devices, it becomes now possible to consider computer systems of far greater complexity than has heretofore been feasible.

A salient feature of persistatron circuits is that operational elements are of the same low order of cost and simplicity as the memory elements themselves. Hence it becomes practicable to consider designs in which the number of operational components lies in the same range as the number of memory units, in marked contrast to conventional practice. For example, the high cost of transistors as against magnetic memory cores in a standard computer system would as a practical matter preclude a system design in which almost as many transistors are used as cores. This drawback is absent in the present invention.

Also, an object of the invention is to provide a persistatron adapted to act as a directional switch selectively to convey a signal to one of two distinct paths, whereby logical circuits can be simply constructed by network combinations of p-switches. The use of persistatron combinations permits great flexibility in design and minimizes fundamental limitations imposed by "time of flight" in large and fast computers.

Yet another object of the invention is to provide a superconductive inverter which reverses the sign of an applied signal and which in combination with persistatron switches enables the construction of logical elements.

A further object of the invention is to provide a multilayer circuit wherein a plurality of p-switches, p-stores and superconductive inverters are operatively intercoupled, whereby a complete logical circuit may be fabricated in the form of a single laminated panel.

Yet another object of the invention is to provide a superconductive switching matrix adapted to address an information pulse to a selected memory unit in an array thereof.

Still another object of the invention is to provide a persistatron structure adapted to minimize the adverse effects of temperature changes resulting from current flow in the persistatron.

For a better understanding of the invention as well as other objects and further features thereof, reference is made to the following detailed description to be read in conjunction with the accompanying drawings, wherein like components in the various figures are identified by like reference numerals.

In the drawings:

FIG. 1 is a graph of the relationship between magnetic field and temperature in a superconductor.

FIG. 2 graphically illustrates the resistance of a superconductive wire as a function of current flow therethrough.

Figure 9:
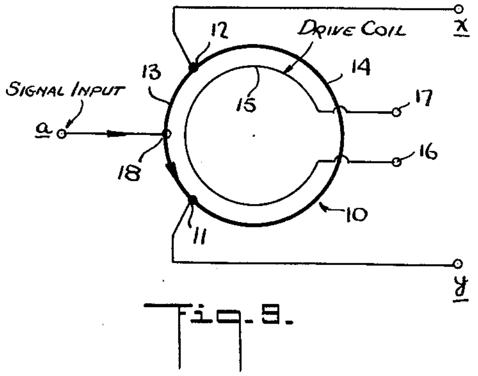

FIG. 9 schematically shows a persistatron switching element (p-switch).

Figure 10:
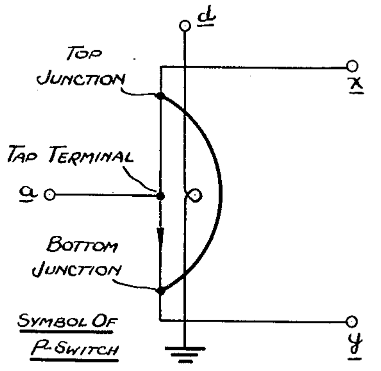

FIG. 10 is the symbolic representation of a p-switch.

Figure 11:
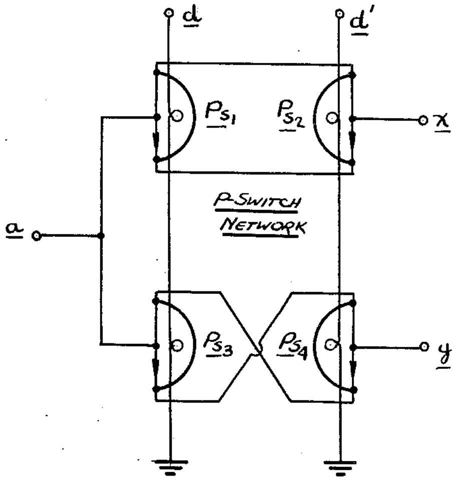

FIG. 11 is a network of p-switches in accordance with the invention.

Figure 12:
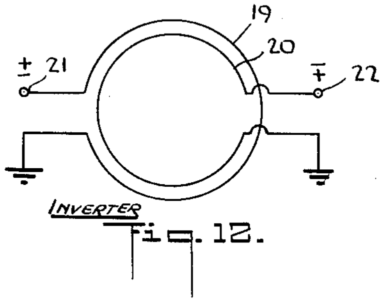

FIG. 12 is a schematic diagram of a superconductive inverter according to the invention.

Figure 13:
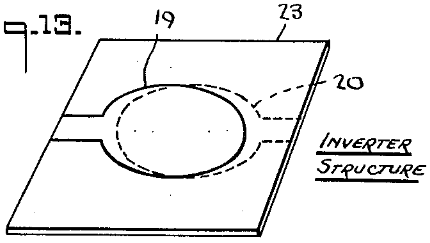

FIG. 13, in perspective, shows a preferred form of an inverter structure.

Figure 14:
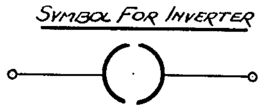

FIG. 14 is the symbolic representation of an inverter.

Figure 15:
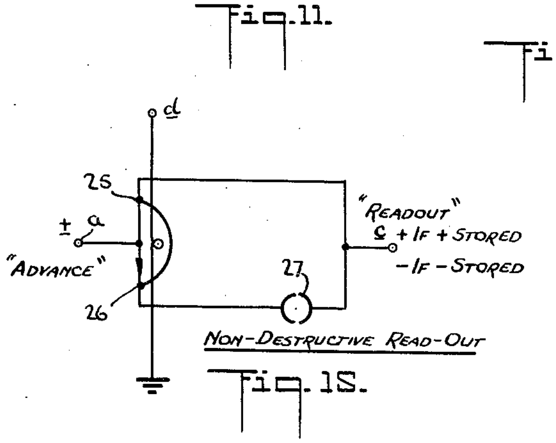

FIG. 15 is a non-destructive read-out device employ- in a persistatron.

Figure 16:
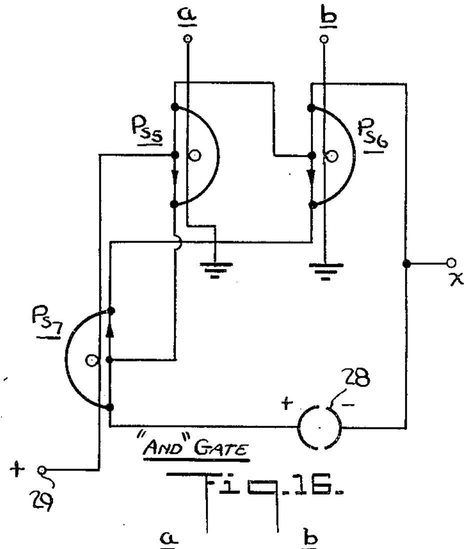

FIG. 16 shows schematically a persistatron "And" gate.

Figure 17:
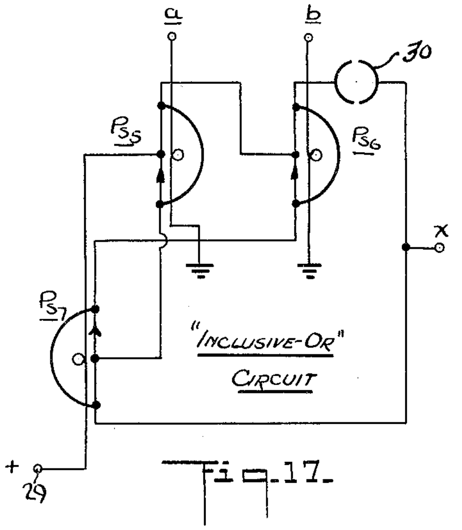

FIG. 17 shows schematically a persistatron "Inclusive Or" circuit.

Figures 18, 19:
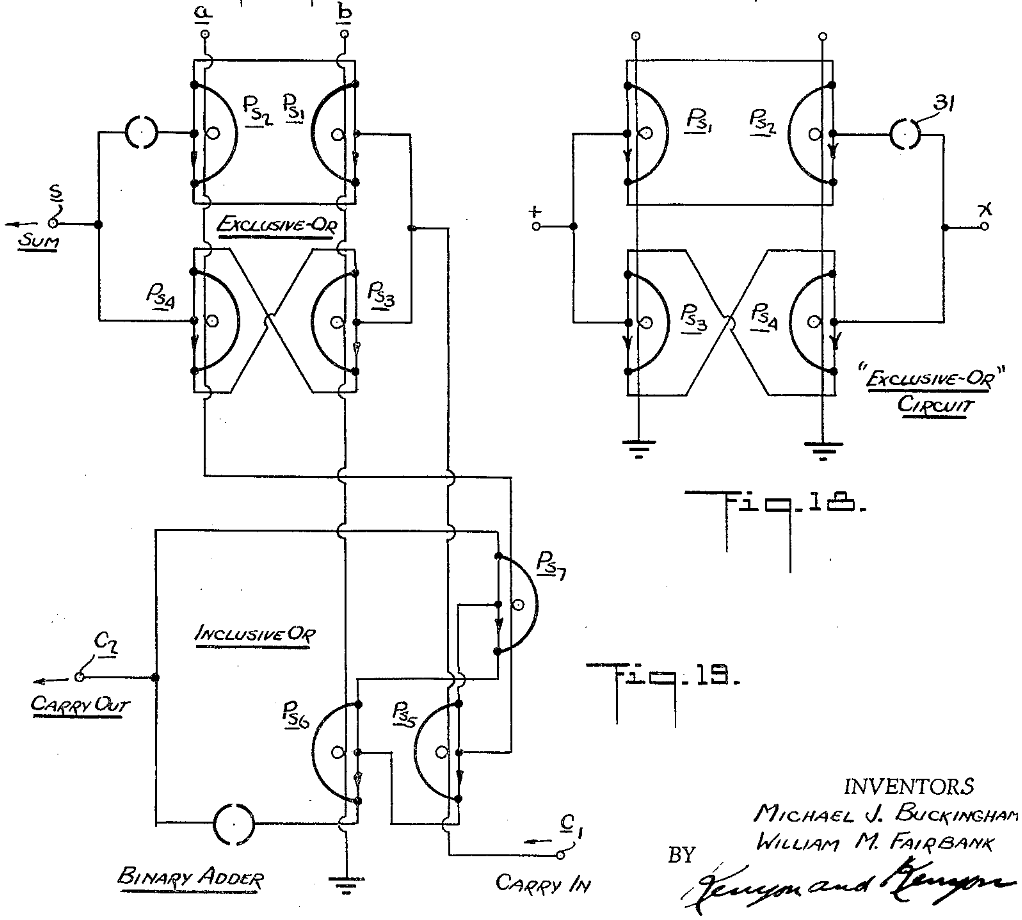

FIG. 18 shows schematically a persistatron "Exclusive Or" circuit.

FIG. 19 shows schematically a persistatron "Binary Adder."

Figures 20, 22:
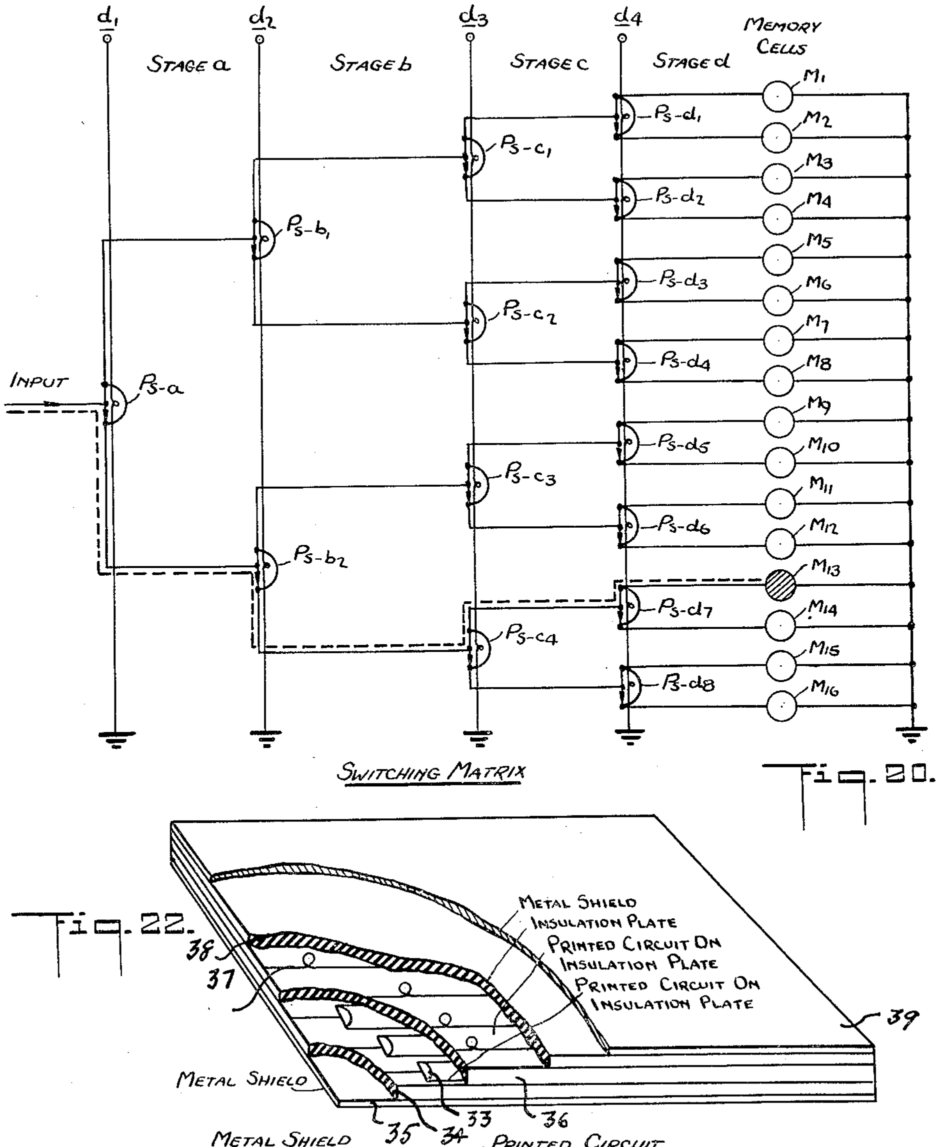

FIG. 20 shows schematically a persistatron "Switching Matrix."

Figures 21, 24, 25:
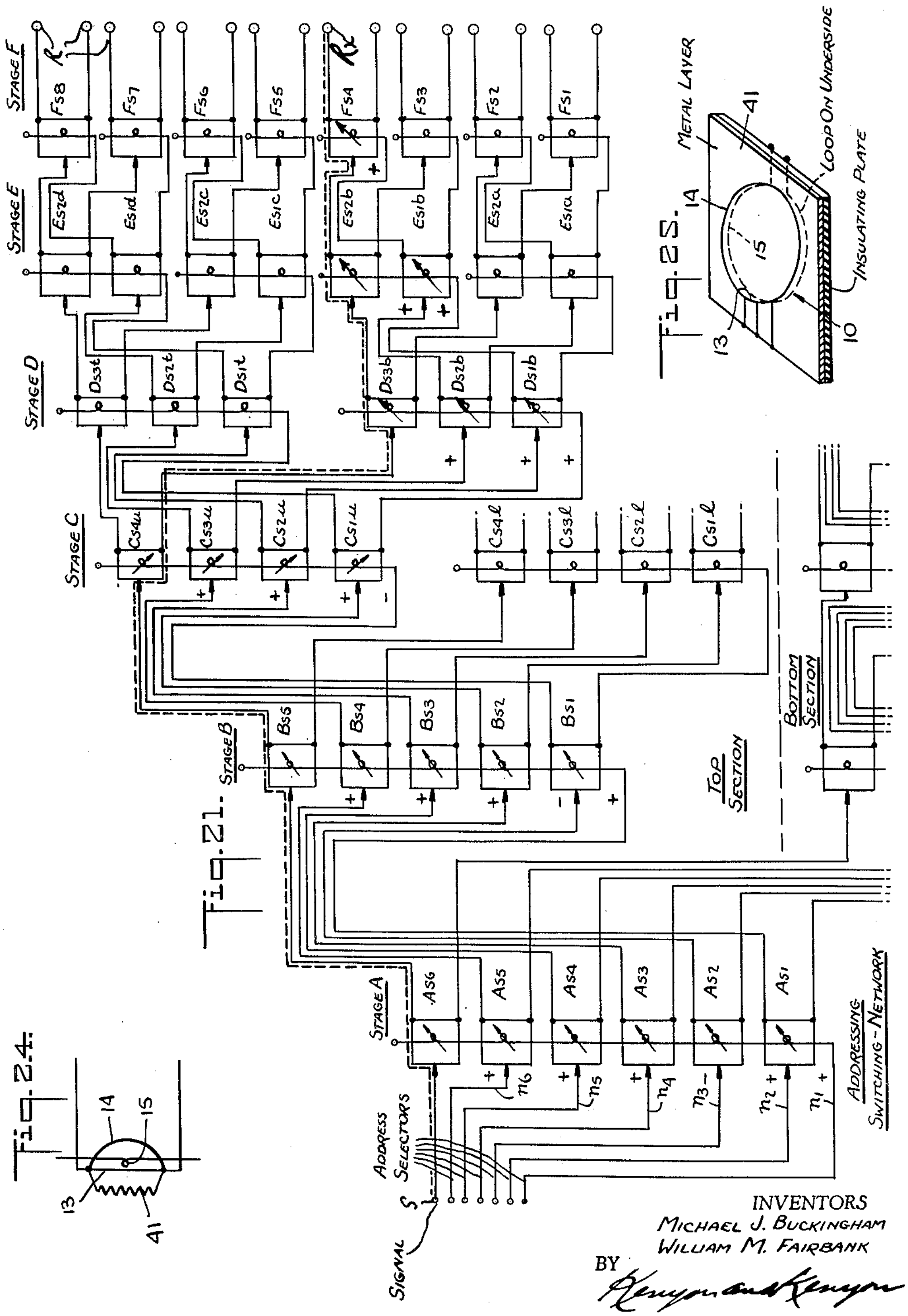

FIG. 21 shows schematically a superconductive switching network for addressing an information pulse to a selected device in an array thereof.

FIG. 22 illustrates, in perspective, a persistatron module construction.

Figure 23:
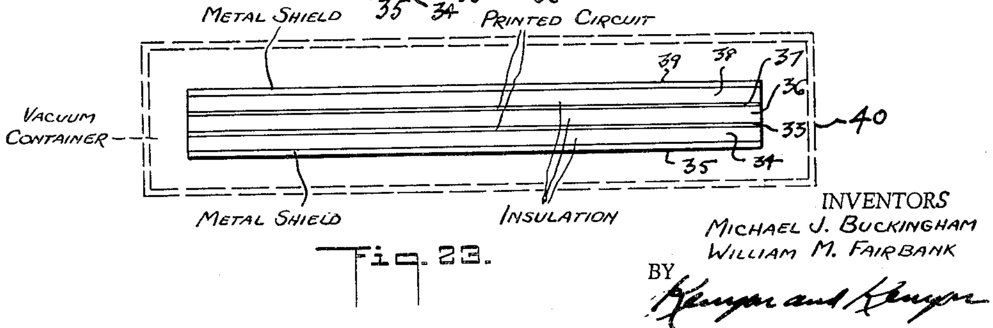

FIG. 23 is a section taken through line 22—22 in FIG. 21.

FIG. 24 is a schematic diagram of a persistatron structure adapted to minimize the effects of temperature changes on the behavior of the device.

FIG. 25 shows in perspective the structure illustrated schematically in FIG. 24.

THE PHENOMENON OF SUPERCONDUCTIVITY

Before describing the structure of the persistatron and explaining its theory of operation, we shall briefly review the phenomenon of superconductivity in order that the properties of superconductive metals may clearly be understood.

Let us begin by considering the normal conduction of an electric current by a metal. A significant property of metals as contrasted to non-metals is their relatively large electrical conductivity. We know that current is transmitted by the motion of electrons driven through the crystal lattices by the applied electric voltage. The electrons collide with the atoms in the lattice and this impedance of their motion constitutes the electrical resistance of the metal.

In general, the resistance increases as the temperature goes up, for the vibrating atoms in the lattice then oscillate over wider distances from their lattice positions and interfere with the electron motion to a greater degree. Conversely, as the temperature of the metal declines, the conductivity generally increases.

An ideally pure metal will have infinite conductivity at the absolute zero temperature (−273° C.=0° K., where K. or Kelvin refers to the absolute temperature scale). However, an actual metal will possess imperfections, as a result of impurities, grain boundaries, lattice defects and other flaws. Consequently the low temperature conductivity of an actual metal will rise only to a finite value, depending on the density of imperfections which scatter the electron current carriers and thereby limit conductivity.

There nevertheless exists a class of metals which in spite of impurities and other defects exhibits infinite conductivity or superconductivity below some finite transition temperature. It is important to bear in mind that the resistance of the material in the superconductive state is not merely extremely low, it is exactly zero within the limits of accuracy of any measurement yet devised.

At the transition temperature, which is a few degrees above absolute zero, there occurs a thermodynamic transition into the superconducting state. The transition temperature is not the same for all superconductive metals. For example, the transition temperature, in the absence of a magnetic field, of tin is 3.7 degrees, of lead is 7.3 degrees, of niobium is 8 degrees, of indium is 3.4 degrees, of vanadium is 5.1 degrees, of tantalum is 4.4 degrees and of technetium is 11 degrees.

Another characteristic peculiar to metals in the superconducting state is the fact that they are perfectly diamagnetic, i.e., impervious to a magnetic field. When a superconductor is subjected to a magnetic field, the lines of the magnetic force are expelled, as contrasted to ferromagnetic materials which concentrate the lines of force. This diamagnetic property of superconductors is directly exploited in the present invention for shielding purposes.

We shall now consider graphically some of the properties of superconductivity which are essential in the working of operational circuit devices in accordance with the invention.

Figure 1:
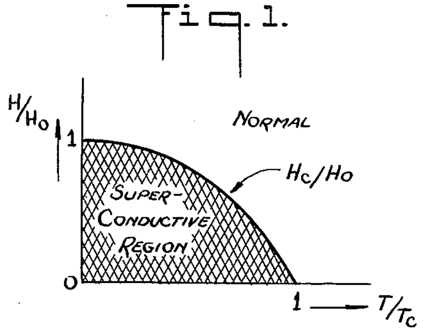

Referring first to FIG. 1, the graph therein shows the relationship between magnetic field strength and temperature in a superconductor. The cross-hatched region in the lower left portion of the area in the graph represents combinations of magnetic field strength and temperature for which the material is superconductive. The area outside the cross-hatched region indicates conditions under which the material displays ordinary electrical resistance.

The symbol T in the horizontal axis represents absolute temperature and symbol $T_c$ the zero field critical temperature. Symbol H in the vertical axis refers to magnetic field strength, $H_o$ being the critical magnetic field at zero temperature. The curve $H_c/H_o$ represents the magnetic field strength at the point of transition. The shape of the curve for any superconductive material is generally as indicated in FIG. 1, but the intercepts at the axes are characteristic for each material.

If the temperature of the material is maintained at a value slightly below the transition temperature at zero magnetic field strength, its resistance can be shifted back and forth between some finite value and zero simply by the application and removal of a small magnetic field.

In a zero magnetic field, there is no latent heat associated with the transition, whereas in a field there is latent heat. The energy differential is very small, of the order of $10^{-8}$ electron volts per atom which is many orders of magnitude less than an equivalent energy for any room temperature phenomenon. It is the minuteness of this energy which is one of the desirable properties for circuit applications.

Figure 2:
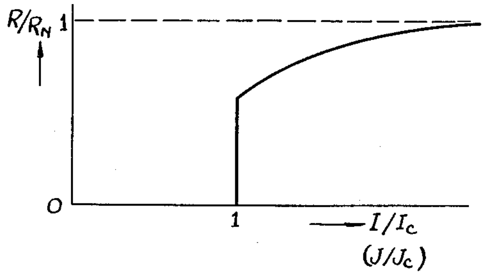

As pointed out above, a superconductive operation device acts by being taken in a controlled fashion back and forth across the transition line separating the normal and superconducting phases. This can be accomplished by a change of temperature, but more readily by a change in magnetic field strength. A change in magnetic field strength can be effected by a current flow in the material itself. Thus, FIG. 2 shows the resistance of a wire of circular cross-section as a function of the current through the wire, the temperature being maintained constant.

Symbol R represents the resistance of the wire and $R_N$ signifies the resistance in the normal state. Symbol I represents current flow in the wire and $I_c$ the value of critical current at which resistance first appears. The current $I_c$ therefore is that value of current which produces a magnetic field $H_c$ (FIG. 1) at the surface of the wire.

Figure 3:
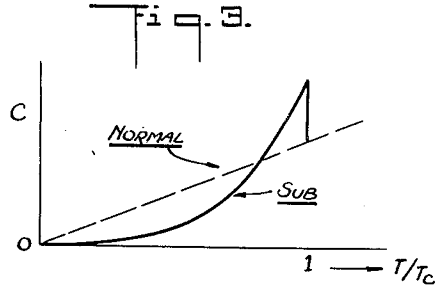
FIG. 3 is a graph showing the relationship between specific heat and temperature of a superconductor.

Referring now to FIG. 3, the relationship between the specific heat C of a superconducting metal as a function of temperature T is shown in a zero field, the dashed line representing the normal condition and the unbroken line the superconducting condition.

Figure 4:
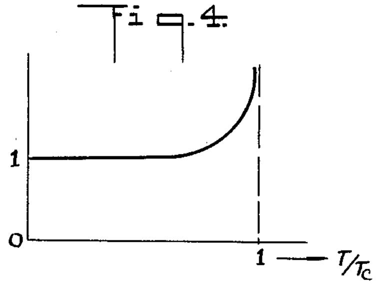
FIG. 4 is a graph illustrating penetration depth as a function of temperature in a superconductor.

As pointed out previously, the diamagnetic properties of a superconductor are such that magnetic fields below the critical value are expelled from the interior of a superconductor. Nevertheless, as shown in FIG. 4, the magnetic field penetrates a finite distance in the superconductor and actually decreases exponentially inside the surface, with a characteristic "penetration depth" which is a function of temperature and which is of the order of a few times $10^{-6}$ cm. As in a normal metal, it becomes infinite as the transition temperature is approached.

Finally, it should be mentioned that there exists a so-called intermediate state which is a mixture of normal and superconductive domains. This occurs, for example, in FIG. 2 in the region wherein current I is greater than $I_c$ or when a superconductor is in a field which is in some places greater than and in other places less than the critical field. At least if it were not for the side effects of heating, many superconducting devices would operate between the superconducting state and intermediate rather than the normal state.

PERSISTENT CURRENT EFFECTS IN A SUPERCONDUCTIVE RING

It has been shown that in a superconducting material the electrical resistance vanishes. Consequently, if the current flows about a hole in an otherwise superconducting material or in a ring-shaped superconductor, the current will not decay with time but will remain trapped in the superconductor. It has been demonstrated that current induced in a superconductive ring will run for years without any measurable decrease in its strength. The term "ring" is applicable to any non-simply connected configuration in the topological sense such as that formed by a hole in the sheet or any closed annular conductor constituting an endless conductive path.

It can be shown that the magnetic flux through the hole (actually that through the hole plus the flux of the penetrating field) retains the same value under stationary external electromagnetic conditions no matter what changes they may have undergone, providing only that the material has remained superconducting throughout. If the material ceases to be superconducting, the flux may then change.

In computer terminology, a number is in storage when its representative is introduced into a medium with the intention that it shall remain there until specifically called for and withdrawn. Thus in order for a superconductive element to act as a memory cell in a digital computer, it must include means to introduce an information "bit" so that it remains locked in or stored in the cell until the bit is read out on demand.

We have seen that to manipulate the magnitude of flux through a superconducting ring it is necessary for the superconducting property to be controllable. Let us assume that a magnetic field is applied in a direction normal to the plane for a ring-shaped superconductor through which, initially, the flux is zero. If the field is increased the flux remains at zero level until the critical value is reached. When the field is further intensified, with the ring in the normal or resistive state, the field then penetrates the ring, and on decreasing the field again to zero, that flux will remain "locked in" which was present when the ring became superconducting again at a critical value. Thus with the external field zero there is now a non-zero flux through the ring.

Similarly if the magnetic field is now reversed in direction and increased beyond the critical value and again reduced to zero, a flux of opposite sign will remain through the ring. The nature of the dependence of flux $\phi$ on magnetic field H is determined by the geometry, also by reason of the demagnetizing effect of the superconducting material and, more important, because of the superconducting ring itself, which while in the superconducting state has the same demagnetizing effect as if it had no "hole."

In fact, if a ring having a radius R is made of superconducting wire which has a radius $r$, the effective critical value of the external field $H_c$ can be made arbitrarily small by making $r/R$ sufficiently small. When $r/R$ is small, the dependence of flux $\phi$ on magnetic field H is in accordance with FIG. 5.

Figure 5:
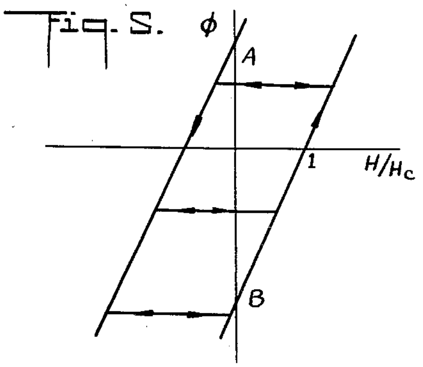
FIG. 5 is a typical hysteresis loop of a superconducting ring involving the relationship of magnetic field to flux.

A typical "hysteresis" loop is illustrated in FIG. 5, the arrows indicating the possible directions of a change. The points marked A and B correspond to the final flux values mentioned above. Starting from zero flux, an increase in magnetic field H leads to no change of flux until the magnetic field value $H_c$ is reached. A further increase in magnetic field H results in a linear increase of flux, following up the diagonal arrow on the right side of the figure with the current in the ring equal to the critical value in, say, the clockwise direction. On decreasing magnetic field H, flux $\phi$ retains the maximum value attained while the current decreases until it becomes critical in the counterclockwise direction. The flux then decreases following down the left diagonal arrow.

Clearly, in principle, the external field H can be produced by applying a current through an appropriate input loop inductively coupled to the ring, and the flux changes detected by means of a pick-up or sensing loop.

The operation of a superconducting device in which $r/R$ is small is best discussed in terms of critical current rather than critical field. The critical current corresponds to the current through the wire producing a magnetic field at the surface equal to the critical field and at which finite resistance appears. The resistance as a function of current in a straight wire has been shown in FIG. 2.

The flux through the ring can only change when $J>>J_c$, when the resistance will take place a value R given by the expression:

$$RJ=\delta\phi/\delta t$$

where $\delta\phi/\delta t$ is the time rate of change of flux, here assumed small, so that $R_nJ_c>>\delta\phi/\delta t$ or $R_n>>wL$, where $w^{-1}$ is the rise time of the input pulse and L is the inductance of the ring. Under these conditions, $J<<J_c$.

The energy dissipated, $\Delta E$, in the resistance when the flux is changed by $\Delta\phi$, is easily calculated. Thus $$\begin{aligned}\Delta E&=\int J^2R\,dt=\int J(\delta\phi/\delta t)\,dt\\&=J_c\int\delta\phi \text{ if } J<<J_c\\&=J_c\Delta\phi\end{aligned}$$

Hence the energy dissipated is simply the product of the critical current and the flux change. If the speed is faster so that the inequality above does not hold, the energy dissipated is larger; $\Delta E$ above is thus the minimum energy dissipation for a flux change $\Delta\phi$.

Throughout the foregoing theoretical discussion it has been supposed that the temperature of the superconductive element has remained at a constant level. In practice, however, the dissipation of the current when the element is in the normal or resistive state may lead to temperature changes. Such temperature changes may be minimized or exploited in various ways and this subject will be treated in greater detail later in the specification.

THE PERSISTATRON MEMORY CELL (P-STORE)

Figure 6:
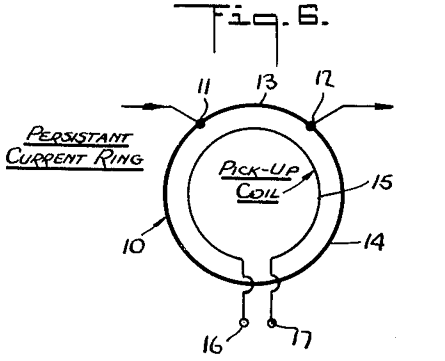
FIG. 6 is a schematic representation of a persistatron in accordance with the invention.

Referring now to FIG. 6, there is shown schematically a persistatron in accordance with the invention comprising a superconductive ring, generally designated by numeral 10, having input terminals 11 and 12 connected to the ring at spaced points thereon to divide the ring into two distinctive branches 13 and 14 of unequal length, the branches being connected in parallel relation relative to the input or junction terminals. A sensing loop 15 is inductively coupled to ring 10 to derive an output therefrom at terminals 16 and 17.

Let us now assume that an input current I is fed to ring 10 through the input terminals 11 and 12, so that the current divides between branches 13 and 14 which shall be said to have inductance values $L_1$ and $L_2$, the current in branch 13 being $I_1$ and that in branch 14 being $I_2$. Thus the total current $I=I_1+I_2$. If the ring is in superconductive state, the flux through it cannot change and the current I will therefore divide in such a way as to ensure this effect.

The flux $\phi$ produced by the currents is:

$$\phi=I_2L_2-I_1L_1$$

Thus if flux $\phi$ is initially zero, the currents divide so that:

$$I_1/I_2=L_2/L_1$$

For definiteness let us suppose $L_2>>L_1$. Then $I_1>>I_2$.

Now as current I increases, $I_1$ will eventually reach the critical value $J_c$ and resistance will start to appear in branch 13. A further increase in current I now causes a flux change, for the branch 13 is no longer superconducting, and the increase of current all passes through branch 14. Thus $I_1$ remains at the value $J_c$; i.e., putting $L_1+L_2=L$, $$\phi=(I-J_c)L_2-J_cL_1,\ (I_1=J_c)$$
$$=IL_2-J_cL;=(I-I_c)L_2;$$

where $I_c$ is the value of I for which $I_1=J_c$.

If the current I is now decreased, both $I_2$ and $I_1$ decrease and the ring is again superconducting, the flux remaining locked in. The dependence of flux on input current I is shown in the hysteresis curve in FIG. 7.

Between the parallel sloping lines the ring is superconducting, on the right the branch 13 has a critical current in one direction, on the left in the opposite direction. It is easily seen that the effective critical value $I_c$ is given by the expression $$I_c=J_cL/L_2$$

During the change of flux, branch 13 has some resistance, $R_1$, and the dissipation in this resistance may readily be calculated. Let us suppose again that the current is changing slowly, i.e.

$$R_n>>\delta\phi/\delta t;$$

where $R_n$ is the maximum resistance of branch 13. Now the E.M.F. across the input is $$L_2\delta I_2/\delta_1 t=L_1\delta I_1/\delta t+R_1I_1$$

i.e., $$R_1I_1=\delta\phi\delta t.$$

Thus when the above inequality is true $$R=J_c^{-1}\delta\phi/\delta t,\ I_1=J_c$$

Then the energy dissipated $\Delta E$ is given by:

$$\Delta E=\int I^2{}_1Rdt=\int I_1\delta\phi J_c\Delta\phi$$

the equality applying for slow conditions, which is the same result as before.

So far as we have discussed only the case in which $R_n>>wL$, where $w^{-1}$ is the rise time of the current pulse, and we shall see that if this is not true, the devices do not have satisfactory properties. The following considerations apply to both devices that have been described.

We saw that during a change of I $$RI_1=\delta\phi\delta t$$

Case (*a*); where $R_n>>wL$, I, reaches a maximum value $J_c$ and remains there, while:

$$\delta\phi/\delta t=L_2\delta I_2/\delta t=L_2\delta I/\delta t$$

Case (*b*); when $R_n<<wL$, the current divides according to the inductances and $I_1\sim IL_2/L$, while the resistance $R_1$ reaches the value $R_n$. Then $$\frac{\delta\phi}{\delta t}=I_1R_n\sim\frac{L_2R_n}{L}I$$

Figure 7:
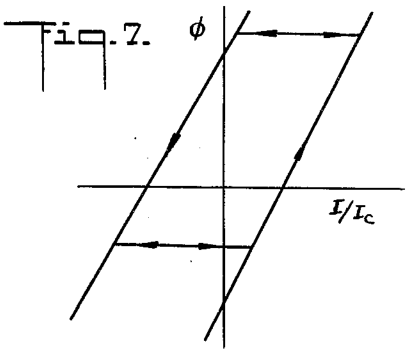
FIG. 7 is a hysteresis loop of a superconducting ring in which the relationship is magnetic flux to current.

In the first case the final flux reaches the value given in FIG. 7 by the hysteresis loop, which does not depend on the actual value of $R_n$. For the same current magnitude pulse in the second case, the flux change is less, the ratio being roughly $$\frac{(\Delta\phi)b}{(\Delta\phi)a}\approx\frac{(\delta\phi/\delta t)b}{(\delta\phi/\delta t)a}\approx\frac{R_n}{L}\frac{I}{\delta I/\delta t}\approx\frac{R_n}{wL}$$

Thus in the case (*b*) the flux does not change by the full amount given by the hysteresis loop, but by only about a fraction $R_n/wL$ of this amount. Thus a second current pulse of the same magnitude will cause a similar change of flux and the detector coil 16 would not differentiate between "0" and "1" memory content. Thus the minimum time of the devices described is of the order $L/R_n$. If in an actual device there are temperature changes during action, a more stringent time limit can exist.

It is clear that the disparate properties of branches 13 and 14 may be achieved in many ways other than geometrically by making the branches of unequal length. For example, the branch lines may be made of different cross-section or of different superconductive materials. The necessary prerequisite in the design of the two branches is that one branch only becomes critical within the range of operation. This may also be accomplished by spacing one branch of the persistatron ring a different distance from a superconductive shielding plane than the other branch.

Figure 8:
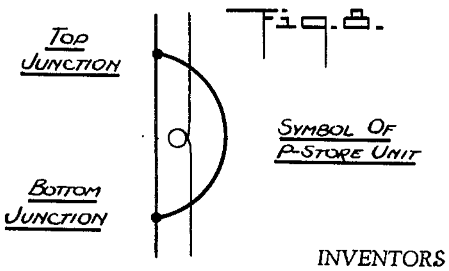
FIG. 8 shows the symbol for a persistatron memory unit (p-store).

To simplify schematic illustration, the persistatron memory unit (p-store) will be represented symbolically in the manner shown in FIG. 8 wherein the D-shaped element stands for the ring, the straight line being the first branch which goes critical and the arc indicates the second branch which is shunted across the first branch. The twist within the D represents the sensing coil. The terminals at the junctions of the two branches will be referred to hereinafter as the top and bottom junctions.

In operation, each information pulse applied to the input terminals of the p-store will be followed by a read-out pulse of known sign, and changes in flux will be detected by the sensing coil. If the read-out pulse is of the same polarity as the previously applied information pulse no flux change will be detected, but if the information pulse is of opposite polarity an output will be produced. In this manner the presence or absence of a stored signal may be detected and where a signal is in store its polarity or sign may be determined.

THE PERSISTATRON SWITCHING UNIT (P-SWITCH)

Referring now to FIG. 9, a persistatron switching unit (p-switch) is illustrated and it will be seen that the essential structure is identical with the p-store, save for the presence of an additional terminal 18 at a tap on the ring positioned between terminals 11 and 12. This tap terminal will hereinafter be called simply the tap. Loop 15 in this instance acts not as a detector but as a drive coil selectively to determine whether an input current applied at the tap is to be switched in the direction of the top junction or in the opposing direction toward the bottom junction.

Let us assume that a current fed into loop 15 induces a current in ring 10 in the counterclockwise direction, as indicated by the arrow, the induced current being equal to the value of critical current. A positive-going current entering at the tap will not divide equally between lines $x$ and $y$ connected to the top and bottom junctions respectively, but will preferentially go to line $x$ in opposition to the flow direction of the induced current, for otherwise it would tend to increase the current flow above critical value and thereby encounter resistance.

If the output impedance at lines $x$ and $y$ is small, say, equivalent to an inductance 1, most of the current goes to line $x$; the ratio of the current to $x$ and $y$ being approximately $L/l$ where L is the inductance of the persistatron ring. Hence in the example given, the applied current is switched to line $x$. However, with the same control current applied to loop 15, a negative-going incoming signal at the tap will be switched to line $y$ instead of to line $x$.

It is evident, therefore, that the p-switch is not like a conventional switch but is capable of switching negative and positive signals in opposite paths. As will be later seen, this unusual operational feature is actually very useful in logical circuits and the special properties of p-switches when exploited in the construction of the more complicated logical elements render even the latter relatively simple.

The p-switch is represented symbolically as shown in FIG. 10, and it will be noted that four current lines are provided, line $a$ going to the tap in the first branch, lines $x$ and $y$ to the top and bottom junction in the persistatron ring and line $d$ going to the drive coil.

Table 1 below illustrates the operation of the p-switch for different signs of input signals at line $a$ and different signs of drive signals at line $d$, the output being fed through lines $x$ or $y$.

*Table 1*

| Input | | Output | |
|---|---|---|---|
| $a$ | $d$ | $x$ | $y$ |
| + | + | + | 0 |
| − | + | 0 | − |
| + | − | 0 | + |
| − | − | − | 0 |

The downward arrow in FIG. 10 indicates the direction of critical current induced in the ring when a positive (+) drive signal is applied to the drive coil through line $d$. Thus with a positive drive signal, when a positive (+) input signal is applied at line $a$ it is directed upwardly to line $x$, the output at line $y$ being zero. When, however, the input at line $a$ is negative (−), the signal will go to line $y$ and the output at line $x$ will then be zero. (The impedance of the load is presumed small as compared to the inductance of the persistatron loop.) With a negative drive signal, = and − input signals will be led in output directions which are the reverse of those given previously.

P-SWITCH COMBINATIONS

A combination of four basic p-switch units $P_{s1}$, $P_{s2}$, $P_{s3}$ and $P_{s4}$ is shown in FIG. 11, so arranged as to form a switching network which is adapted selectively under the control of drive signals to direct either a negative or positive incoming signal to one or the other of two output paths. In contradistinction, a p-switch, per se, directs a positive or negative signal into opposite paths.

P-switches $P_{s1}$ and $P_{s2}$ are connected with their junctions in parallel relation, whereas in p-switches $P_{s3}$ and $P_{s4}$ the junctions are cross-coupled. An input signal applied at line $a$ is fed to the taps of both $P_{s1}$ and $P_{s3}$, whereas output line $x$ is connected to the tap of $P_{s2}$ and output line to the tap of $P_{s4}$.

The drive coils of $P_{s1}$ and $P_{s3}$ are serially connected to line $d$ and the drive loops of $P_{s2}$ and $P_{s4}$ are serially connected to line $d'$. Thus a positive drive signal applied at line $d$ simultaneously induces critical current in $P_{s1}$ and $P_{s3}$ in the direction indicated therein by the arrows, and a positive drive signal at line $d'$ acts similarly with respect to $P_{s2}$ and $P_{s4}$.

As shown in Table 2 below, the switching network directs a positive or negative input signal to the same output, i.e., to line $x$ if $d$ and $d'$ have opposite signals and to line $y$ if they are the same.

*Table 2*

| input ($a$) | drive ($d$) | drive ($d'$) | output ($x$) | output ($y$) |
|---|---|---|---|---|
| + | + | + | 0 | + |
| − | − | − | | − |
| + | + | − | + | 0 |
| − | − | + | − | |

Thus if drive $d'$ permanently has a given signal (e.g. by inserting persistent currents in the loops it drives), the direction taken by the signal in line $a$ is determined solely by the polarity of the $d$ signal.

SUPERCONDUCTIVE INVERTER

FIG. 12 shows an inverter in accordance with the invention constituted simply by a superconductive input loop 19 inductively coupled to a superconductive output loop 20 to provide a unit ratio transformer.

A signal of one sign applied relative to ground to the input terminal 21 connected to the input loop 19 will induce a signal of the reverse sign relative to ground at the output terminal 22 connected to output loop 20. Unlike conventional transformers, the applied current may be in a steady state.

The coupling between loops should be as nearly perfect as possible. This ideal can be approached by forming single turn loops as metallic paths evaporated or sputtered onto opposing faces of an insulating plate 23, as shown in FIG. 13, the loops having, for example, a radius of a few centimeters. The spacing between the loops may be made extremely small by the use of a fine dielectric layer. The desired configuration of the device may be formed by stencilling means, by cathode ray scanning or any other known technique.

Symbolically, the inverter is represented as in FIG. 14, the return leads being omitted. As will be shown in the succeeding sections, the superconductive inverter when combined with p-switches make it possible to construct various logical elements.

NON-DESTRUCTIVE READ-OUT MEMORY DEVICE

FIG. 15 illustrates schematically a simple form of a non-destructive read-out for a persistatron memory unit or p-store 24 provided with top and bottom junctions 25 and 26, a tap $a$ and a drive line $d$. Top junction 25 is connected to an information output terminal $c$ and bottom junction 26 is connected through a superconductive inverter 27 to output terminal $c$. Advance signals are applied to tap $a$ to read out the stored information.

Let us assume that positive information to be stored is applied to drive terminal $d$ to induce a persistent current in the ring in the counterclockwise direction indicated by the arrow. A positive advance signal applied to terminal $a$ will travel through the upper leg of the first branch and junction 25 to output terminal $c$ to provide a positive output signal. A negative advance signal applied to terminal *a* will travel through the lower leg of the first branch and junction 26 and be reversed in sign by inverter 27 to supply a positive output signal at output terminal *c*. Thus if positive information is stored, a positive signal will be read out regardless of whether the advance signal is + or —.

Should the stored information be negative, with the current flow direction in the ring the reverse of that shown in FIG. 15, a positive or negative advance signal will produce a negative signal at output terminal *c*. Thus the read-out signal is + or — when a + or — bit is stored in the memory cell, irrespective of the sign of the advance signal (the amplitude of the advance signal must be chosen in relation to the magnitude of the stored persistent current). If the output goes to a finite load, this circuit is not 100% non-destructive.

POSITIVE AND NEGATIVE MODULUS

The same unit illustrated in FIG. 15 can be used as a positive and negative modulus to produce an output signal of a given sign, irrespective of the input sign. Thus, if a positive signal applied at terminal *d* induces a persistent current in the arrow direction, an input signal of either polarity applied at terminal *a* will always result in a positive output signal at *c*. But if the signal applied at terminal *d* induces a persistent current in the direction opposing the arrow, a negative or positive input signal will always produce a negative output. This is indicated in Table 3 below:

*Table 3*

| a | b | c |
|---|---|---|
| + − | + | + |
| + − | − | − |

BASIC "AND" AND "OR" PERSISTATRON CIRCUITS

An "AND" circuit is a logical element having two or more inputs and one output, where the signals applied to the inputs are of a binary nature and where the output signal is a certain binary function of the input signals. Thus, if binary "1" is represented by a positive (+) signal and binary "0" by a negative (—) signal, an "AND" function is obtained from a device which produces a positive (+) output signal (binary value "1") only if both the input signals are coincidentally positive. The "OR" circuit is analogous to the "AND" circuit with the difference that the output signal will be positive (binary value "1") if at least one of the input signals is positive.

Referring now to FIG. 16, there is shown an "AND" gate comprising three persistatron switches $P_{s5}$, $P_{s6}$ and $Ps_7$ and an inverter 28. A constant positive current is applied at terminal 29 through the drive coil of $P_{s7}$ to the tap of $P_{s5}$. The tap of $P_{s7}$ is connected to the lower junction of $P_{s5}$, whose upper junction is connected to the tap of $P_{s6}$. The upper junction of $P_{s7}$ is connected to the lower junction of $P_{s6}$, whereas the lower junction of $P_{s7}$ is connected through inverter 28 to the output terminal *x* to which output terminal is also connected to the upper junction of $P_{s6}$. The drive coil of $P_{s5}$ goes to input terminal *a*, and that of $P_{s6}$ goes to input terminal *b*.

As demonstrated in Table 4 below, a positive output will be obtained only when both the input signals at terminals *a* and *b* are positive, in which case the positive-going current from terminal 29 will travel serially through the upper legs of $P_{s5}$ and $P_{s6}$ to the output terminal *x*. In all other instances, whether the input signals are both negative or of mixed polarity, the output will be negative.

*Table 4*

| input | | output |
|---|---|---|
| a | b | x |
| + | + | + |
| + | − | − |
| − | + | − |
| − | − | − |

In the Inclusive "OR" circuit shown in FIG. 17, the circuit is identical to the "AND" circuit in FIG. 16 except that an inverter 30 is interposed between $P_{s6}$ and output terminal *x* rather than between $P_{s7}$ and the output terminal, this circuit being merely an inverted "AND" gate. The positive bias at terminal 29 is retained, but the signals applied to the *a* and *b* terminals are in a direction reversing the current arrows in p-switches $P_{s5}$ and $P_{s6}$.

Alternatively, the "AND" device itself with a negative drive applied to terminal 29 is adapted without any other change to behave as an Inclusive "OR" device. The fact that the essential character of the circuit can be altered merely by changing the polarity of the drive without any change of components is one of the unique and valuable features of this invention and is of distinct advantage in the design of sophisticated circuits.

The operation of this circuit is demonstrated in Table 5 below:

*Table 5*

| input | | output |
|---|---|---|
| a | b | c |
| + | + | + |
| + | − | + |
| − | + | + |
| − | − | − |

It will be seen that as long as either of the input signals is positive or both are positive, a positive output will be obtained.

Referring now to FIG. 18, there is shown an Exclusive "OR" circuit which is identical with the switching network shown in FIG. 11 except that the output of $P_{s4}$ is connected through an inverter 31 to the output terminal *x*. A constant positive voltage is applied to the taps of p-switches $P_{s1}$ and $P_{s3}$, and the input signals are applied to lines *a* and *b* to drive the serially connected coils of $P_{s1}$ and $P_{s3}$ and $P_{s2}$ and $P_{s4}$, respectively.

The operation of this device is demonstrated in Table 6 below:

*Table 6*

| input | | output |
|---|---|---|
| a | b | x |
| + | − | − |
| − | + | + |
| + | − | + |
| − | + | − |

BINARY ADDER

The special properties of the logical "AND" and "OR" element illustrated in the previous section can be used to advantage in the more complicated logical elements, such as the single-stage binary adder shown in FIG. 19.

It will be seen that the binary adder essentially combines the Exclusive "OR" circuit of FIG. 18 with the Inclusive "OR" circuit of FIG. 17. It is to be noted that the total number of persistatrons is seven in the single-stage binary adder, as compared to twenty-five transistors in a standard transistorized binary adder, or forty-four cryotrons in a cryotron binary adder as proposed by Buck.

The carry-in terminal $C_1$ is connected through the drive coil of $P_{s5}$ to the taps of $P_{s1}$ and $P_{s3}$, the carry-out terminal $C_2$ being connected to the output of the Inclusive "OR" section and the sum terminal S being connected to the output of the Exclusive "OR" section.

Input signal *a* is applied through the serially-connected drive coils in persistatron units $P_{s2}$, $P_{s4}$ and $P_{s7}$ to the tap of $P_{s5}$. Input signal *b* is connected through the drive coils of $P_{s1}$, $P_{s3}$ and $P_{s6}$, while carry-in signal $C_1$ goes through the drive coil of $P_{s5}$ to the taps of both $P_{s1}$ and $P_{s3}$.

The operation is given in Table 7 below:

*Table 7*

| input | | | output | |
|---|---|---|---|---|
| *a* | *b* | $C_1$ | $C_2$ | S |
| + | + | + | + | + |
| + | + | − | | |
| + | − | + | + | − |
| − | + | + | | |
| − | − | + | | |
| − | + | − | − | + |
| + | − | − | | |
| − | − | − | − | − |

PERSISTATRON SWITCHING MATRIX

Referring now to FIG. 20, there is shown a persistatron switching matrix or pyramid whereby an input signal may be selectively addressed to any one of a plurality of memory cells or p-stores. By way of example, an array of sixteen p-stores $M_1$ to $M_{16}$ is shown but it will be obvious that a greater or smaller number may be incorporated in the matrix.

The matrix is divided into four stages in the form of a geometric progression, stage A having a single p-switch $Ps{-}a$ to whose tap is applied the input signal to be addressed. The two output junction lines of $Ps{-}a$ are connected to the taps of the two p-switches $Ps{-}b_1$ and $Ps{-}b_2$ in stage B, and the junction outputs of the latter are connected to the taps of four p-switches $Ps{-}c_1$ to $Ps{-}c_4$ in the third stage C. The outputs of the third stage p-switches are connected to the taps of the eight p-switches $Ps{-}d_1$ to $Ps{-}d_8$ in the fourth and final stage. The outputs of the p-switches in the final stage are connected to the respective p-stores $M_1$ to $M_{16}$, all of the p-stores being connected to a common ground through a non-superconductive isolating bus 32 of normally conductive material which prevents interaction between the p-stores.

The matrix is controlled by drive terminals $d_1$, $d_2$, $d_3$ and $d_4$. Terminal $d_1$ goes to the single-drive coil in the first stage, terminal $d_2$ goes to the two serially-connected drive coils in the second stage, terminal $d_3$ to the four serially-connected drive coils in the third stage and $d_4$ to the eight serially-connected coils in the final stage.

The polarity of the drive current determines the direction taken by the input signal and its ultimate destination. Let us assume, for example, that a positive incoming signal is to be sent to p-store $M_{13}$, and the positive drive signals induce currents in the direction indicated by the arrows in the p-switches.

This is accomplished by making $d_1$ negative, $d_2$ negative, $d_3$ positive and $d_4$ positive to cause the signal to take the circuitous course through the four stages indicated by the dashed line. Thus by different combinations of drive signals, an input signal of either polarity may be sent to any selected p-store in the array. The direction or polarity of current through the drive lines may be controlled by p-switches operated by an addressing device responsive to the polarity of the input.

SUPERCONDUCTIVE SWITCHING NETWORK

In the persistatron switching matrix illustrated in FIG. 20, there is shown an array of sixteen memory units for which fifteen switching units are required. In order to address information to any one memory unit is is necessary to actuate all of the switching units. Where the number of memory or information-receiving units is very large, the need to drive all of the switching units for each addressing operation may be disadvantageous. The switching network or tree illustrated in FIG. 21 also acts to address an information signal to a selected receiver but involves a relatively small number of driven switches for completing the circuit connection, as compared to the total number of receivers.

In the matrix shown in FIG. 20 a drive signal is applied to each of the successive stages and acts to activate all of the switching units therein. In the circuit shown in FIG. 21, a multi-stage arrangement is provided requiring a larger number of switching units than receivers, the number of units increasing progressively from stage to stage. However, from stage to stage, the number of units which must be driven to effect a connection is progressively diminished until finally in the last stage only a single unit is driven to complete the connection.

Referring now to FIG. 21, the network comprises six stages, A, B, C, D, E and F, for addressing an input signal applied at terminal S to a selected receiver in an array of sixty-four receiver lines R, a fourth of which are actually shown. Drive signals are applied at inputs $n_1$, $n_2$, $n_3$, $n_4$, $n_5$ and $n_6$. Thus $n$ inputs select one of $2^n$ lines and where in the present example $n=6$, then $2^n=64$. This is accomplished by actuating $1/2n\ (n+1)$ switches, the total number of switches being equal to $2^{n+1}-n-2$.

The switches called for in this circuit are not simple p-switches but switch assemblies such as are shown in FIG. 11 which are adapted, under the control of a drive signal, to direct either a negative or positive incoming signal to one or the other of two output paths. Thus the direction in which a signal is sent does not depend on the signal polarity but on the drive polarity.

In Stage A, six switching units $AS_1$ to $AS_6$ are involved, drive $n_1$ being applied to the drive coils of all the switches in this stage, drives $n_2$ to $n_6$ being applied to the inputs of switches $AS_1$ to $AS_5$ and the input information signal being applied to the input of $AS_6$.

Stages B, C, D, E and F are divided into identical top and bottom sections, only the top section being developed in the figure. The top section of Stage B is constituted by five switching units $BS_1$ to $BS_5$ whose input taps are connected to the upper junctions of switches $AS_2$ to $AS_6$, respectively. The lower junctions of switches $AS_2$ to $AS_6$ are connected to the input taps of the five switching units in the bottom section of Stage B.

The top section of Stage C consists of two groups of four switches each, the inputs for the upper group $CS_{1u}$ to $CS_{4u}$ being connected to the upper junctions of switches $BS_2$ to $BS_5$ in the Stage B, the upper junction of switch $BS_1$ being connected to the drive coils for the upper group switches. The lower junctions of switches $BS_1$ to $BS_5$ are similarly connected with respect to the lower group of switches $CS_{1l}$ to $CS_{4l}$ in the Stage C.

The top section of Stage D is divided into two pairs of three-switch groups, each pair being coupled to one group of switches in Stage C. Only the upper of the two pairs is shown, the top group thereof consisting of switches $DS_{1t}$ to $DS_{3t}$ and the bottom of $DS_{1b}$ to $DS_{3b}$.

The upper junction of switch $CS_{1u}$ in Stage C is connected to the drive coils in the top group switches $DS_{1t}$ to $DS_{3t}$ in Stage D, whereas the upper junctions of switches $CS_{2u}$ to $CS_{4u}$ goes to the inputs of switches $DS_{1t}$ to $DS_{2t}$, respectively. The lower junctions of switches $CS_{1u}$ to $CS_{4u}$ are similarly connected to the bottom group switches $DS_{1b}$ to $DS_{3b}$.

In Stage E, the upper sections consist of four groups each having two switches, namely, $ES_{1a}$ to $ES_{2a}$, $ES_{1b}$ and $ES_{2b}$, $ES_{1c}$ and $ES_{2c}$, and $ES_{1d}$ and $ES_{2d}$. The upper junctions of switches $DS_{1t}$ to $DS_{3t}$ are coupled to switches $ES_{1d}$ and $ES_{2d}$, and the lower junctions of switches $DS_{1t}$ to $DS_{3t}$ are coupled to switches $ES_{1c}$ and $ES_{2c}$. Similarly, the junctions of switches $DS_{1b}$ to $DS_{3b}$ are coupled to the two groups of switches $ES_{1a}$ and $ES_{2a}$, and $ES_{1b}$ and $ES_{2b}$.

The final stage F is provided with a bank of switches $FS_1$ to $FS_8$, one switch being provided for each of the switches in the previous stage E. The manner in which these switches are intercoupled is as follows. The lower junction of switch $ES_{1a}$ goes to the drive of switch $FS_1$ and the upper junction to the drive of switch $FS_2$. The lower junction of switch $ES_{2a}$ goes to the input of $FS_1$, while the upper junction goes to the input of $FS_2$. The switches $ES_{1b}$ and $ES_{2b}$ are similarly connected with respect to switches $FS_3$ and $FS_4$, switches $ES_{1c}$ and $ES_{2c}$ are likewise coupled to switches $FS_5$ and $FS_6$, and switches $ES_{1d}$ and $ES_{2d}$ to switches $FS_7$ and $FS_8$.

In order to demonstrate the operation of the switching network, we shall give as an example the problem of addressing an input information signal to the receiver $R_x$. This can be accomplished by control signals applied to control terminals $n_1$ to $n_6$ having the following polarity values:

$$n_1=+$$
$$n_2=+$$
$$n_3=-$$
$$n_4=+$$
$$n_5=+$$
$$n_6=+$$

Let us first consider the effect of the + control signal on Stage A of the network. It causes the switches $AS_1$ to $AS_6$ therein to send input signals in the direction of the upper junction as indicated by the arrows. Thus the entire bottom section of Stage B connected to the bottom junctions of Stage A will be rendered inactive and all further action will take place in the top section. Since the input to $AS_1$ is +, to $AS_2$ is −, to $AS_3$ is +, to $AS_4$ is + and to $AS_5$ is +, there will consequently be a + control applied to the drive coils only of the upper group of switches $BS_1$ to $BS_5$ in Stage B, so that all signals applied thereto are fed to the upper junctions and hence to the upper group of switches $CS_{1u}$ to $CS_{4u}$ in Stage C.

The control signals from $AS_2$ to $AS_5$ are applied to the inputs of $BS_1$ to $BS_4$ in the respective polarities of −+++, the information signal being applied to the input of $BS_5$. Thus applied to the drive of switches $CS_{1u}$ to $CS_{4u}$ in Stage C is a − control, causing these switches to send their signals to the bottom group of switches $DS_{1b}$ to $DS_{3b}$ in Stage D. A + control is applied to the drive of this D group, and to the inputs is applied the following: $DS_{1b}$ is +, $DS_{2b}$ is +, while at $DS_{3b}$ is applied the information signal.

Since a + control is applied to the D Stage switches $DS_{1b}$ to $DS_{3b}$, this activates switches $ES_{1b}$ and $ES_{2b}$ in Stage E, a + control being applied to these E switches, $ES_{1b}$ having a + input and $ES_{2b}$ having the input information. The + control from the upper junction of $ES_{1b}$ is applied to drive $FS_4$ to whose input is fed the input information from the upper junction of $ES_{2b}$. Thus the input information is fed to receiver $R_x$.

Reviewing now the number of switches in the network which are activated when carrying out the addressing function, it will be seen that in Stage A; six switches are activated, in Stage B; five are activated, in Stage C; four are activated, in Stage D; three are activated, in Stage E; two are activated, and in Stage F; one is activated.

The network arrangement disclosed is merely exemplary and it will be apparent that a far greater number of receivers may be selectively controlled, the number ($n$) of inputs selecting $2^n$ receivers by actuating $1/2n$ ($n+1$) switches rather than the full complement thereof as in the matrix previously described. The network disclosed is not limited to the use of switches of the type specifically disclosed herein, and may incorporate any switching element adapted to switch a signal of any polarity in one or two directions determined by the polarity or sense of a control signal.

In a number of the circuit designs discussed herein it will be observed that there are closed current paths composed of various connecting leads and operating elements. While it is ordinarily advantageous to use superconductive lines for connecting leads and the like, such leads in some instances may give rise to the development of spurious persistent currents.

Such parasitics can be avoided by the use of normal conductors rather than superconductive materials in order to introduce resistance which inhibits the build-up of persistent currents. It is to be understood that the circuits formed by the superconductive elements disclosed herein may be operatively combined with known superconductive elements, such as the cryotron mentioned previously.

PERSISTATRON COMPUTER STRUCTURES

As is evident from the foregoing sections, the various logical functions can be carried out by combinations of persistatron and superconductive inverter units. No other circuit elements are called for and consequently the persistatron system lends itself to printed circuit techniques in which all of the elements and the interconnections therefor are formed in a two-dimensional plane. With modern evaporation and sputtering techniques the persistatron elements can be made of film wires having molecular thickness. Moreover, the perfect shielding properties of superconductors makes it possible to achieve a very high density of elements.

Referring now to FIGS. 22 and 23, there is shown a laminated multi-layer panel of relatively small size containing a complete logical system formed of interconnected persistatrons and inverters. A persistatron circuit 33 is printed, stenciled, evaporated or otherwise formed as superconductive film paths on the top face of an insulating plate 34, on whose bottom face is a planar superconductive layer 35 acting as a diamagnetic shield. Laminated to the top face of insulating plate 34 is a second dielectric plate 36 on whose top face is printed another superconductive circuit 37. It will be noted that two layers of circuit are provided in order that the coupling loops for the persistatrons lie in one plane and the rings in a second plane directly thereover to effect a close inductive coupling.

Above printed circuit 37 there is laminated another dielectric layer 38 whose top surface is plated with a planar superconductive shielding coating 39. Thus, the entire circuit is sandwiched between two closely spaced shielding planes and extraneous couplings are avoided. In order to maintain the circuit in a superconductive state as required, the entire panel may be mounted within a liquid helium container 40 in which the helium is insulated by vacuum chambers, the helium container being coupled to a helium source including the usual vacuum pumping means. As is well known, liquid helium at very low temperatures will flow intimately about all parts of the apparatus and will thereby maintain the circuit at a uniform temperature to prevent hot spots and ensure the desired superconductive effects.

As pointed out previously, the disparate properties of the first and second branches may be obtained by spacing the distance of one branch closer to the shield plane than the other branch. In this way the branches may be of the same length and yet possess different properties, so that only one goes critical within the operating range.

TEMPERATURE-COMPENSATED PERSISTATRONS

It has been pointed out previously that when the critical element in a persistatron is switched, the resistance that appears leads to dissipation which may result in a temperature change. This rise in temperature can adversely affect the speed of operation, for the restoration of the element to its superconductive operating temperature may be delayed. This delay can be minimized by an appropriate choice of the thermal properties of the materials involved (insulators and superconductors) to permit rapid heat removal. Also, control of the amount of heat dissipation occurring in the element itself can be effected by the electrical design.

Referring again to FIG. 1, it will be seen that the critical magnetic field (critical current) decreases as the temperature rises. Thus when a current in the critical element in the persistatron reaches critical value and dissipation causes the temperature to rise, the value of this characteristic critical current is now diminished in view of the change in temperature value.

In accordance with another aspect of the invention, in order to minimize the effect to temperature variation on the persistatron, the persistatron circuit is plated or otherwise formed on a conductive layer, rather than on an insulating layer. The conductive layer is constituted by a non-superconductive material such as copper or a copper base alloy (e.g. beryllium copper. In a traditional sense the persistatron would appear to be shorted out by the metal layer. However, in the region of superconductive temperatures, the persistatron provides a current path of perfect conductivity, whereas the layer offers a finite resistance.

The conductive layer 41 which is effectively shunted across the critical element 13, as shown in FIGS. 24 and 25, has a negligible effect when the latter is superconductive since in electrical terms the layer constitutes a finite resistance connected in parallel relation with a zero resistance. But when the critical element is rendered resistive, then the finite resistance of the conductive layer which is smaller than that of the critical element in the normal state serves to limit current flow in the latter and thereby minimizes heat dissipation. This means that the time constant of the persistatron is determined by the conductive layer shunt.

As an example, the resistance of the critical element in the normal state may be in the order of a hundred ohms or more when the element is formed by a very thin film, whereas the resistance of the shunting layer covering a relatively broad expanse could have an effective value of one-tenth of an ohm. Consequently only when one-thousandth of the dissipation occurs in the critical element itself and the desired time constant is obtained.

In practice, as shown in FIG. 25, the persistatron ring 10 may be formed on a metallic layer 41 plated on one side of an insulating plate 42, the drive or pick-up coil 15 being coated on the other side of the plate in inductive relation to the ring.

It is also to be noted that capacitive effects in persistatron structures by reason of the proximity of the p-units and leads are negligible, for the impedance of persistatron circuits is extremely low.

While there have been disclosed what are considered to be preferred embodiments of the invention, it will be apparent that many changes and modifications may be made therein without departing from the essential spirit of the invention. It is intended therefore in the appended claims to cover all such changes and modifications as fall within the true scope of the invention.

What is claimed is:

1. An electrical element comprising first and second branches formed of superconductive material and connected in parallel relation, means to pass a current through said parallel-connected branches, said branches having disparate properties such that for a given level of current only one of said branches attains a critical value resulting in finite resistance, and circuit means inductively coupled to said branches.

2. A superconductive element, as set forth in claim 1, wherein said disparate branches are of unequal length whereby the inductance of the second branch is greater than that of the first branch.

3. A superconductive element, as set forth in claim 1, wherein said disparate branches are of different cross-sectional area.

4. A superconductive element, as set forth in claim 1, wherein said disparate branches are formed of different superconductive materials.

5. An electrical element comprising first and second branches formed of superconductive material and connected at their ends to provide junction terminals, means to maintain said branches at a temperature at which their resistivity is zero, means connected to said terminals to pass current through said branches, said branches having disparate properties such that for a given current level only one of said branches attains a critical value resulting in finite resistance, and a loop inductively coupled to said branches.

6. An electrical element, as set forth in claim 5, further including a current path effectively shunted across said branches and formed of conductive material whose resistance is substantially less than the finite resistance of said critical branch.

7. An electrical element, as set forth in claim 6, wherein said first and second branches are formed on a conductive layer constituting said shunt current path.

8. A persistatron unit comprising first and second branches formed of superconductive material and connected at their ends to provide junction terminals, means to maintain said branches at a temperature at which their resistivity is zero, means connected to said terminals to pass current through said branches, said branches having unequal inductance values such that for a given current level only one of said branches attains a critical value resulting in finite resistance, and a loop inductively coupled to said branches to detect current flow therein.

9. A persistent-current memory device comprising a ring of superconductive material, means to cause a persistent current to flow in said ring in a direction representative of information to be stored, and means coupled to said ring to detect the existence and direction of said persistent current.

10. A persistent-current memory device comprising a ring of superconductive material, first and second terminals on said ring at spaced points thereon to divide said ring into first and second parallel branches of unequal size, means connected to said terminals to pass a current through said branches, and a loop of superconductive material inductively coupled to said ring to detect current stored therein.

11. A persistent-current memory device comprising a ring of superconductive material, first and second input terminals on said ring at spaced points thereon to divide said ring into first and second parallel branches of unequal size, means to maintain said ring at a temperature at which its resistivity is zero, means connected to said terminals to pass a current through said branches representative of information to be stored, and a loop of superconductive material inductively coupled to said ring to detect current stored therein.

12. A persistent-current switch comprising a ring of superconductive material, first and second terminals on said ring at spaced points thereon dividing said ring into first and second parallel branches of unequal size, only said first branch attaining a critical value resulting in a finite resistance when a given level of current passes therethrough, means to apply an incoming signal to an intermediate tap in said first branch, and a drive coil coupled to said ring to induce a current in said first branch at critical value and in a direction which determines the direction taken by said incoming signal relative to said first and second terminals.

13. A persistatron switch comprising a ring of superconductive material, first and second output terminals on said ring at spaced points thereon dividing said ring into first and second parallel branches of unequal size, said first branch being of relatively low inductance and attaining a critical value resulting in a finite resistance when a given level of current passes therethrough, means to maintain said branches at a temperature at which the resistivity of the ring is zero, means to apply an incoming signal to an intermediate tap in said first branch, and a drive coil coupled to said ring to induce a current in said first branch at critical value and in a direction which determines the direction taken by said incoming signal relative to said first and second terminals.

14. A persistent-current switch adapted selectively to direct a positive or negative signal into opposite paths comprising first and second superconductive branches connected at their ends by junction terminals, first and second output paths connected to said terminals, said branches having different characteristics whereby only said first branch attains critical value when a given level of current passes therethrough, a tap connected at an intermediate point in said first branch, means maintaining said branches at a temperature at which their resistivity is zero, a drive coil coupled to said branches, means to apply an incoming signal to said tap, and means to apply a drive current to said coil inducing a current in said first branch in a given direction and having a critical value whereby said incoming signal is directed to one of said paths depending on its polarity.

15. A switching network adapted selectively under the control of drive signals to direct either a negative or positive incoming signal to one or the other of two output paths, said network comprising first, second, third and fourth persistatron switches each including top and bottom junctions, a tap and a drive coil, the junctions of said first and second switches being connected in parallel relation, the junctions of said third and fourth switches being cross-coupled, said two output paths being connected to the respective taps of said second and fourth switches, said incoming signal being applied to the taps of both said first and third switches, means to apply a first drive signal serially to the drive coils of said first and third switches, and means to apply a second drive signal serially to said second and fourth switches.

16. A superconductive inverter comprising first and second loops in closely coupled relationship and formed of superconductive material, means to maintain said loops at a temperature at which their resistivity is zero, whereby a current applied to the first loop induces a current in the second loop in reverse polarity.

17. A non-destructive read-out persistatron unit including a superconductive ring, first and second junctions on said ring dividing said ring into two disparate branches, a tap in the shorter branch on said ring and a drive coil coupled to said ring, means to apply a signal to be stored to said drive coil to induce a persistent-current in said ring, superconductive inverter means connecting said first junction directly to an output terminal and second junction through said inverter to said output terminal, and means to apply an advance current to said tap to effect readout of said stored current.

18. A persistatron "and" circuit comprising first, second and third persistatron units each including a superconductive ring having top and bottom junctions and a tap thereon and a drive coil coupled thereto, a superconductive inverter, an output terminal connected to the top junction of said second unit and through said inverter to the bottom junction of said third unit, means to apply a positive bias current through the drive coil of said third unit to the tap of said first unit, the tap of said third unit being connected to the bottom junction of said first unit and the tap of said second unit being connected to the top junction of said first unit, and means to apply first and second input signals to the drive coils of said first and second units respectively to produce a positive output only in the event both input signals are positive.

19. An "inclusive or" circuit comprising first, second and third persistatron units each including a superconductive ring having top and bottom junctions and a tap thereon and a drive coil coupled thereto, a superconductive inverter connecting the top junction of the second unit to an output terminal, said terminal being connected also to the bottom junction of the third unit, means to apply a positive bias through the drive coil of the third unit to the tap of the first unit, the tap of the third unit being connected to the bottom junction of the first unit, the tap of the second unit being connected to the top junction of he first unit, the top junction of the third unit being connected to the bottom junction of the second unit, and means to apply first and second input signals to the drive coils of the first and second units to produce a positive output as long as either of the input signals is positive or both are positive.

20. An "exclusive or" circuit comprising first, second, third and fourth persistatron units each including a superconductive ring, top and bottom junctions and a tap thereon and a drive coil coupled thereto, a superconductive inverter, the junctions of the first and second units being connected in parallel relation and the junctions of the third and fourth units being cross-coupled, means to apply a positive bias to the taps of the first and third units, an output terminal connected directly to the tap of the fourth unit and through said inverter to the tap of the second unit, means to apply a first input signal to the serially connected drive coils of said first and third units, and means to apply a second input signal to the serially connected drive coils of said second and fourth units.

21. A binary adder stage comprising seven persistatron units each including a superconductive ring, top and bottom junctions, a tap on the ring and a drive coil coupled thereto, the junctions of the first and second units being parallel connected and the junctions of the third and fourth units being cross-connected, the tap of the sixth unit being connected to the bottom junction of the fifth unit, the top junction of the fifth unit being connected to the tap of the seventh unit, the top junction of the sixth unit being connected to the bottom junction of the seventh unit, first and second superconductive inverters, a carry-out terminal connected through said first inverter to the bottom junction of the sixth unit and directly to the top junction of the seventh unit, a carry-in terminal connected through the drive coil of the fifth unit to the taps of the first and second units, a sum output terminal connected through the second inverter of the tap of the second unit and directly to the tap of the fourth unit, a first signal input connected serially through the drive coils of the second, fourth and seventh units to the tap of the fifth unit, and a second signal input connected serially through the drive coils of the first, third and sixth units.

22. A persistatron switching matrix comprising a series of stages, the first of which contains a single persistatron unit and the others a different number of persistatron units, the number of units in successive stages varying in accordance with a geometric progression, each unit being constituted by a ring having two junctions and a tap thereon, and a drive coil coupled to the ring, the junctions in the unit in the first stage being coupled to the respective taps of the units in the second stage and the junctions of the units in each of the succeeding stages save for the last stage being likewise connected, the junctions of the units in the last stage being each connected to a load, separate drive means coupled to the drive coils in each stage, and means to apply an incoming signal to the tap of the unit in the first stage, which signal is conveyed in a path determined by the polarity of the drive signals applied to the succeeding stages.

23. A switching matrix, as set forth in claim 22, wherein each memory device is connected to a common ground through a non-superconductive bus to obviate interaction between the devices.

24. A persistatron switching matrix for addressing an incoming signal to a selected persistatron memory device comprising a series of stages, the first of which contains a single persistatron unit and the others a different number of persistatron units, the number of units in successive stages varying in accordance with a geometric progression, each unit being constituted by a ring having two junctions and a tap thereon, and a drive coil coupled to the ring, an array of persistatron memory devices, the junctions in the unit in the first stage being coupled to the taps of the unit in the second stage and the junctions of the units in the succeeding stages save for the last stage being likewise connected, the junctions of the units in the last stage being connected to respective memory devices, separate drive means coupled to the drive coils in each stage, and means to apply an incoming signal to the tap of the unit in the first stage, which signal is conveyed in a path determined by the polarity of the drive signals applied to the succeeding stages.

References Cited in the file of this patent

UNITED STATES PATENTS

| | | |
|---|---|---|
| 2,707,223 | Hollmann | Apr. 26, 1955 |
| 2,853,697 | Silliman | Sept. 23, 1958 |
| 2,866,842 | Matthias | Dec. 30, 1958 |
| 2,877,448 | Nyberg | Mar. 10, 1959 |
| 2,888,201 | Housman | May 26, 1959 |
| 2,930,908 | McKeon et al. | Mar. 29, 1960 |
| 2,962,216 | Housman | Nov. 29, 1960 |
| 2,962,681 | Lentz | Nov. 29, 1960 |

OTHER REFERENCES

Garwin: An Analysis of the Operation of a Persistent-Super-Current Memory Cell, I.B.M. Journal (October 1957) pp. 304 to 308.

Cryogenic Devices in Logical Circuitry and Storage, Electrical Manufacturing (pages 78–83) February 1958.

Trapped Flux Superconducting Memory, IBM Journal, October 1957.

UNITED STATES PATENT OFFICE
CERTIFICATE OF CORRECTION

Patent No. 3,043,512 July 10, 1962

Michael J. Buckingham et al.

It is hereby certified that error appears in the above numbered patent requiring correction and that the said Letters Patent should read as corrected below.

Column 6, line 50, strike out "place"; column 7, line 58, the equation should appear as shown below instead of as in the patent:

$$R_n J_c >> \delta \varnothing / \delta t$$

line 63, the equation should appear as shown below instead of as in the patent:

$$L_2 \delta I_2 / \delta t = L_1 \delta I_1 / \delta t + R_1 I_1$$

column 12, line 72, for "element" read -- elements --; column 20, line 16, for "he" read -- the --.

Signed and sealed this 20th day of November 1962.

(SEAL)
Attest:

ERNEST W. SWIDER
Attesting Officer

DAVID L. LADD
Commissioner of Patents